(12) United States Patent
Kang et al.

(10) Patent No.: US 10,209,443 B2
(45) Date of Patent: Feb. 19, 2019

(54) MULTI-WAVELENGTH TRANSMISSION APPARATUS USING CYLINDRICAL LENSES

(71) Applicant: ELECTRONICS AND TELECOMMUNICATIONS RESEARCH INSTITUTE, Daejeon (KR)

(72) Inventors: Hyun Seo Kang, Gwangsan-gu (KR); Eun Kyoung Jeon, Gwangsan-gu (KR); Jaisang Koh, Buk-gu (KR); Keo-Sik Kim, Buk-gu (KR); Sung Chang Kim, Buk-gu (KR); Jeong Eun Kim, Gwangsan-gu (KR); Ji Hyoung Ryu, Jeonju-si (KR); Hyoungjun Park, Buk-gu (KR); Dong Hoon Son, Gwangsan-gu (KR); Chan Il Yeo, Gwangsan-gu (KR); Dongsoo Lee, Yongin-si (KR); Seihyoung Lee, Gwangsan-gu (KR); Young Soon Heo, Gwangsan-gu (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/804,653

(22) Filed: Nov. 6, 2017

(65) Prior Publication Data

US 2018/0128978 A1 May 10, 2018

(30) Foreign Application Priority Data

Nov. 8, 2016 (KR) .................. 10-2016-0148397
Mar. 9, 2017 (KR) .................. 10-2017-0030186

(51) Int. Cl.
| | |
|---|---|
| *H04J 14/02* | (2006.01) |
| *H04B 10/2513* | (2013.01) |
| *G02B 6/12* | (2006.01) |

(52) U.S. Cl.
CPC ...... *G02B 6/12009* (2013.01); *H04J 14/0202* (2013.01); *H04J 14/0215* (2013.01); *H04J 14/0256* (2013.01); *H04J 14/022* (2013.01)

(58) Field of Classification Search
CPC ............. H04J 14/0202; H04J 14/0215; H04B 10/2513
See application file for complete search history.

(56) References Cited

U.S. PATENT DOCUMENTS

| | | |
|---|---|---|
| 8,540,437 B2 | 9/2013 | Lee et al. |
| 8,822,230 B2 | 9/2014 | Miyoshi et al. |

(Continued)

FOREIGN PATENT DOCUMENTS

| | | |
|---|---|---|
| KR | 10-2008-0104529 | 12/2008 |
| KR | 10-2010-0017360 | 2/2010 |

(Continued)

*Primary Examiner* — Shi K Li
(74) *Attorney, Agent, or Firm* — Staas & Halsey LLP

(57) ABSTRACT

Disclosed is a multi-wavelength transmission apparatus including a wavelength divider to divide an optical signal by wavelength and output wavelength-divided optical signals to different positions, the optical signal being received from an optical circulator, a first cylindrical lens to diverge the wavelength-divided optical signals along an X axis and a Y axis and allow the wavelength-divided optical signals to be promoted in a Z-direction, a second cylindrical lens to diverge optical signals output from the first cylindrical lens along the X axis and the Y axis and allow the output optical signals to be promoted in the Z-direction, and a reflector to reflect optical signals output from the second cylindrical lens toward the second cylindrical lens, the first cylindrical lens (Continued)

being identical in shape to the second cylindrical lens and rotated by 90° in an Y-axial direction based on the second cylindrical lens.

10 Claims, 14 Drawing Sheets

(56) References Cited

U.S. PATENT DOCUMENTS

| | | | | |
|---|---|---|---|---|
| 2005/0213215 | A1* | 9/2005 | Mitamura | G02B 6/12007 |
| | | | | 359/589 |
| 2011/0150467 | A1 | 6/2011 | Kang et al. | |
| 2011/0310471 | A1 | 12/2011 | Kavosh et al. | |
| 2014/0192417 | A1* | 7/2014 | Chann | G02B 27/0944 |
| | | | | 359/623 |
| 2014/0348464 | A1 | 11/2014 | Kamura et al. | |

FOREIGN PATENT DOCUMENTS

| | | |
|---|---|---|
| KR | 10-1001277 | 12/2010 |
| KR | 10-2012-0030265 | 3/2012 |
| KR | 10-2014-7000690 | 5/2012 |
| KR | 10-2014-0163769 | 11/2014 |
| KR | 10-2016-0027747 | 3/2016 |
| KR | 10-2016-0061185 | 5/2016 |

* cited by examiner

MULTI-WAVELENGTH TRANSMISSION APPARATUS USING CYLINDRICAL LENSES

CROSS-REFERENCE TO RELATED APPLICATION(S)

This application claims the priority benefit of Korean Patent Application No. 10-2016-0148397 filed on Nov. 8, 2016 in the Korean Intellectual Property Office and Korean Patent Application No. 10-2017-0030186 filed on Mar. 9, 2017 in the Korean Intellectual Property Office, the disclosures of which are incorporated herein by reference for all purposes.

BACKGROUND

1. Field

One or more example embodiments relate to an apparatus for transmitting a multi-wavelength optical signal by differently applying cylindrical lenses having the same characteristic.

2. Description of Related Art

Numerous optical elements including a wavelength divider such as an arrayed waveguide grating (AWG) and a plurality of optical lenses are used to transmit a multi-wavelength optical signal. An AWG chip may be provided in a waveguide structure based on a planar lightwave circuit (PLC).

An optical signal input via an input end of the AWG chip may be promoted to a waveguide of a slab 1 and sequentially pass the waveguide and a slab 2, and be divided by wavelength. Through this, the divided optical signals may be separated to different positions and output through different ports. The above structure may allow an optical signal to be divided by wavelength and thus, may be applicable to various types of multi-wavelength transmission such as wavelength-based chromatic dispersion compensation, optical amplification, and the like.

In this instance, the beam divided by wavelength and output through an output end of the AWG may be output in a form of oval instead of a form of circle and thus, focusing may need to be performed using a lens.

In related arts, Korean Patent Application No. 10-2014-7000690 discloses a multi-core fiber connection device that is an optical device for connecting a multi-core fiber to a single-core fiber, the multi-core fiber connection device including a first optical system positioned on the optical axes of a plurality of beams emitted from a multi-core fiber, the first optical system for separating the optical axes of the beams from each other by making the optical axes non-parallel to each other, and a second optical system for making the optical axes of the plurality of beams substantially parallel to each other, the optical axes having been non-parallel to each other at the first optical system.

Also, Korean Patent Registration No. 10-1144665 discloses an apparatus for wavelength-division multiplexing and demultiplexing, an optical communication module, and an optical device. The apparatus for wavelength-division multiplexing and demultiplexing includes a first lens block having a lens array at one side thereof, a second lens block having a lens surface corresponding to the lens array and combined with the other side of the first lens block, a receptacle having an optical fiber ferrule fixed at the center thereof and stacked on the second lens block, and a base combined with one side of the first lens block, the first block being stacked on the base.

However, since different types of optical lenses are used to transmit a multi-wavelength optical signal in the related arts, it is impossible to use the above devices as a chromatic-dispersion compensation apparatus.

Accordingly, there is a desire for an apparatus to transmit a multi-wavelength optical signal and to be used as a chromatic-dispersion compensation apparatus.

SUMMARY

An aspect provides an apparatus for rotating at least one of a plurality of cylindrical lenses having the same characteristic to independently control phases of wavelength-divided optical signals for each wavelength.

According to an aspect, there is provided a multi-wavelength transmission apparatus including a wavelength divider configured to divide an optical signal by wavelength and output wavelength-divided optical signals to different positions, the optical signal being received from an optical circulator, a first cylindrical lens configured to diverge the wavelength-divided optical signals along an X axis and a Y axis and allow the wavelength-divided optical signals to be promoted in a Z-direction, a second cylindrical lens configured to diverge optical signals output from the first cylindrical lens along the X axis and the Y axis and allow the output optical signals to be promoted in the Z-direction, a reflector configured to reflect optical signals output from the second cylindrical lens toward the second cylindrical lens, and a controller configured to rotate at least one of the first cylindrical lens and the second cylindrical lens and control an optical signal passing through the at least one of the first cylindrical lens and the second cylindrical lens to be maintained, diverged, or collected.

The optical signals reflected by the reflector are incident to the wavelength divider by passing through the second cylindrical lens and the first cylindrical lens, collected in the wavelength divider, and incident to the optical circulator.

The first cylindrical lens may include at least one of a first face configured to maintain incident optical signals and output the maintained incident optical signals, a second face configured to diverge incident optical signals and output the diverged incident optical signals, and a third face configured to collect incident optical signals and output the collected optical signals, and the controller may be configured to rotate the first cylindrical lens such that the wavelength-divided optical signals are output to one of the first face, the second face, and the third face.

The second cylindrical lens may include at least one of a first face configured to maintain incident optical signals and output the maintained incident optical signals, a second face configured to diverge incident optical signals and output the diverged incident optical signals, and a third face configured to collect incident optical signals and output the collected optical signals, and the controller may be configured to rotate the second cylindrical lens such that the wavelength-divided optical signals are output to one of the first face, the second face, and the third face.

According to another aspect, there is also provided a multi-wavelength transmission apparatus including a wavelength divider configured to divide an optical signal by wavelength and output wavelength-divided optical signals to different positions, the optical signal being received from an optical circulator, a first cylindrical lens configured to diverge the wavelength-divided optical signals along an X axis and a Y axis and allow the wavelength-divided optical signals to be promoted in a Z-direction, a second cylindrical lens configured to diverge optical signals output from the first cylindrical lens along the X axis and the Y axis and allow the output optical signals to be promoted in the Z-direction, and a reflector configured to reflect optical signals output from the second cylindrical lens toward the second cylindrical lens, wherein the first cylindrical lens is identical in shape to the second cylindrical lens and is rotated by 90 degrees in an Y-axial direction based on the second cylindrical lens.

The wavelength-divided optical signals may output from the wavelength divider such that a beam travelling along the X axis is collimated and a beam travelling along the Y axis is diverged at the first cylindrical lens, and a beam travelling along the X axis and a beam travelling along the Y axis are collimated at the second cylindrical lens.

The optical signals may be reflected from the reflector such that a beam travelling along the X axis is collimated and a beam travelling along the Y axis is focused at the second cylindrical lens, and a beam travelling along the X axis and a beam travelling along the Y axis are focused at the first cylindrical lens.

According to still another aspect, there is also provided a multi-wavelength transmission apparatus including a wavelength divider configured to divide an optical signal by wavelength and output wavelength-divided optical signals to different positions, the optical signal being received from an optical circulator, a first cylindrical lens configured to diverge the wavelength-divided optical signals along an X axis and a Y axis and allow the wavelength-divided optical signals to be promoted in a Z-direction, a second cylindrical lens configured to diverge optical signals output from the first cylindrical lens along the X axis and the Y axis and allow the output optical signals to be promoted in the Z-direction, and a reflector configured to reflect optical signals output from the second cylindrical lens toward the second cylindrical lens, wherein the second cylindrical lens is identical in shape to the first cylindrical lens and is rotated by 90 degrees in an Y-axial direction based on the first cylindrical lens.

The wavelength-divided optical signals may be output from the wavelength divider such that a beam travelling along the X axis is diverged and a beam travelling along the Y axis is collimated at the first cylindrical lens, and a beam travelling along the X axis and a beam travelling along the Y axis are collimated at the second cylindrical lens.

The optical signals may be reflected from the reflector such that a beam travelling along the X axis is focused and a beam travelling along the Y axis is collimated at the second cylindrical lens, and a beam travelling along the X axis and a beam travelling along the Y axis are focused at the first cylindrical lens.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
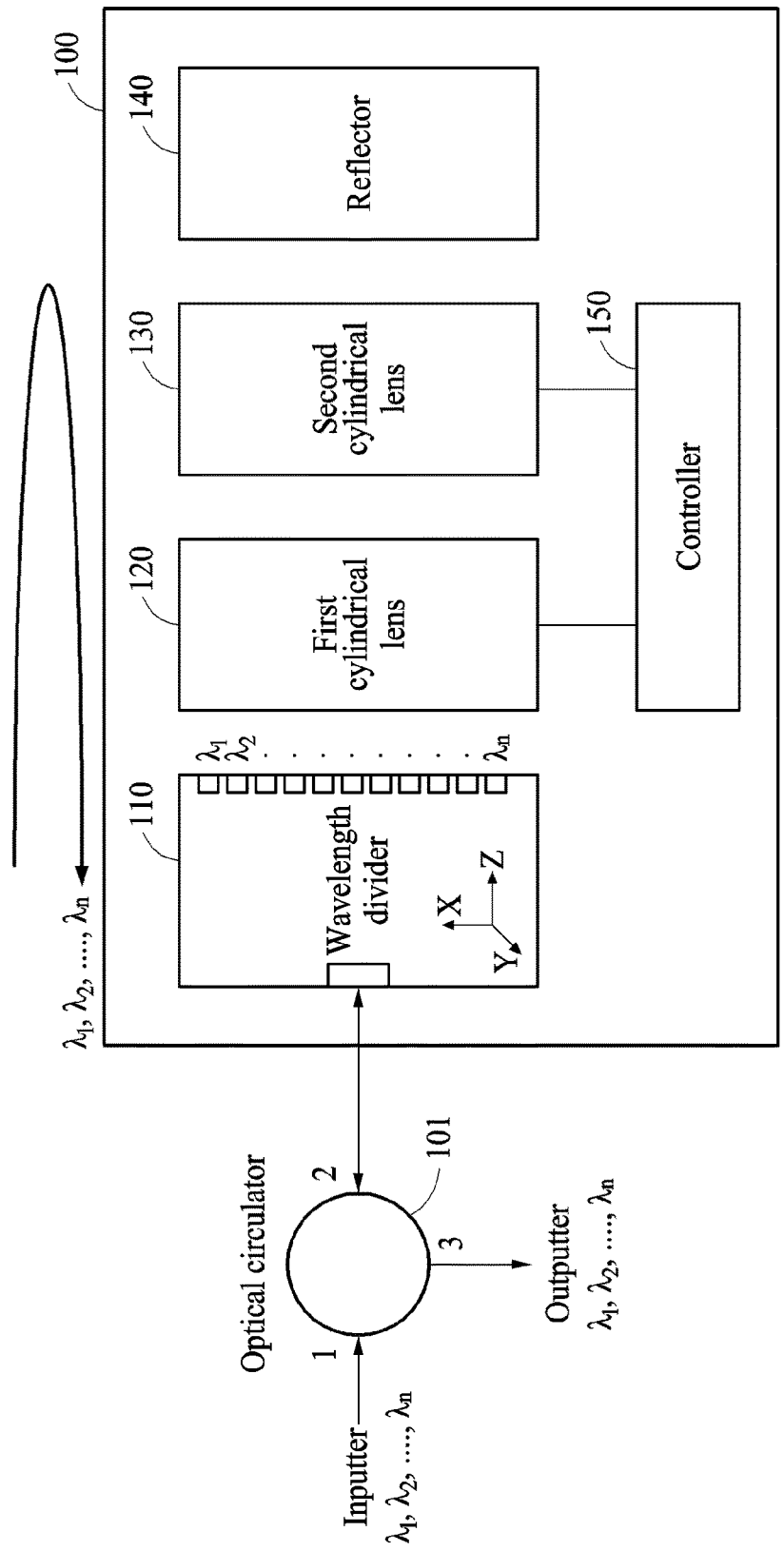
FIG. 1 is a diagram illustrating a multi-wavelength transmission apparatus according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure. A multi-wavelength transmission method may be performed by a multi-wavelength transmission apparatus.

FIG. 1 is a diagram illustrating a multi-wavelength transmission apparatus according to an example embodiment.

Referring to FIG. 1, a multi-wavelength transmission apparatus 100 may interface with an optical circulator to input and output an optical signal. Also, the multi-wavelength transmission apparatus 100 may include a wavelength divider 110, a first cylindrical lens 120, a second cylindrical lens 130, a reflector 140, and a controller 150.

The wavelength divider 110 may divide an optical signal input from the optical circulator by wavelength and output wavelength-divided optical signals to different positions.

For example, optical signals $\lambda_1, \lambda_2, \ldots, \lambda_n$ input to a first port of the optical circulator may be output using a second port. Optical signals output from the second port may be input to an inputter of the wavelength divider 110. In this example, as illustrated in FIG. 1, the optical signal may be divided by wavelength in the wavelength divider 110 and thus, the optical signals $\lambda_1, \lambda_2, \ldots, \lambda_n$ may be output from different positions.

The first cylindrical lens 120 may diverge the wavelength-divided optical signals along an X axis and a Y axis and allow the wavelength-divided optical signals to be promoted in a Z-direction. The first cylindrical lens 120 may include at least one of a first face configured to maintain incident optical signals and output the maintained incident optical signals, a second face configured to diverge incident optical signals and output the diverged incident optical signals, and a third face configured to collect incident optical signals and output the collected optical signals.

The second cylindrical lens 130 may allow the optical signals output from the first cylindrical lens 120 to be promoted in the Z-direction while diffusing beams along an X axis and a Y axis. The second cylindrical lens 130 may include at least one of a first face configured to maintain incident optical signals and output the maintained incident optical signals, a second face configured to diverge incident optical signals and output the diverged incident optical signals, and a third face configured to collect incident optical signals and output the collected optical signals. Also, positions of the incident optical signals output from the second cylindrical lens 130 to the reflector 140 may differ for each wavelength similarly to a case in which the optical signals are output from the wavelength divider 110.

The reflector 140 may reflect the optical signals output from the second cylindrical lens 130, to the second cylindrical lens 130. The reflector 140 may be, for example, a liquid crystal on silicon (LCoS) to change a phase of an input optical signal. The multi-wavelength transmission apparatus 100 using the LCoS as the reflector 140 may also be used as a chromatic-dispersion compensation apparatus.

Also, the optical signals reflected from the reflector 140 may pass through the second cylindrical lens 130 and the first cylindrical lens 120 to be incident to the wavelength divider 110. In this example, the optical signal $\lambda_1$ reflected from the reflector 140 may be incident to a port of the wavelength divider 110 from which the optical signal $\lambda_1$ has been output. As such, each of the optical signals reflected from the reflector 140 may be incident to a port the of the wavelength divider 110 having output the corresponding optical signal.

Also, the incident optical signals may be collected at the wavelength divider 110 so as to be output as the optical signals $\lambda_1, \lambda_2, \ldots, \lambda_n$. The optical signals $\lambda_1, \lambda_2, \ldots, \lambda_n$ output from the wavelength divider 110 may be input to a second port of the optical circulator, and then output from a third port of the optical circulator.

The controller 150 may control the optical signals passing through the first cylindrical lens 120 or the second cylindrical lens 130 to be maintained, diverged, or collected by rotating at least one of the first cylindrical lens 120 and the second cylindrical lens 130.

The controller 150 may rotate the first cylindrical lens 120 such that the wavelength-divided optical signals are output to one of the first face, the second face, and the third face of the first cylindrical lens 120. Also, the controller 150 may rotate the second cylindrical lens 130 such that the wavelength-divided optical signals are output to one of the first face, the second face, and the third face of the second cylindrical lens 130.

Also, the first cylindrical lens 120 or the second cylindrical lens 130 may be rotated by 90° in the Y-axial direction so as to be disposed in the multi-wavelength transmission apparatus 100. In this example, the controller 150 may not be used.

The multi-wavelength transmission apparatus 100 may independently control phases of wavelength-divided optical signals for each wavelength by rotating at least one of a plurality of cylindrical lenses having the same characteristic. Also, the multi-wavelength transmission apparatus 100 may independently control phases of wavelength-divided optical signals for each wavelength so as to be applicable as a dispersion compensation apparatus.

Figure 2:
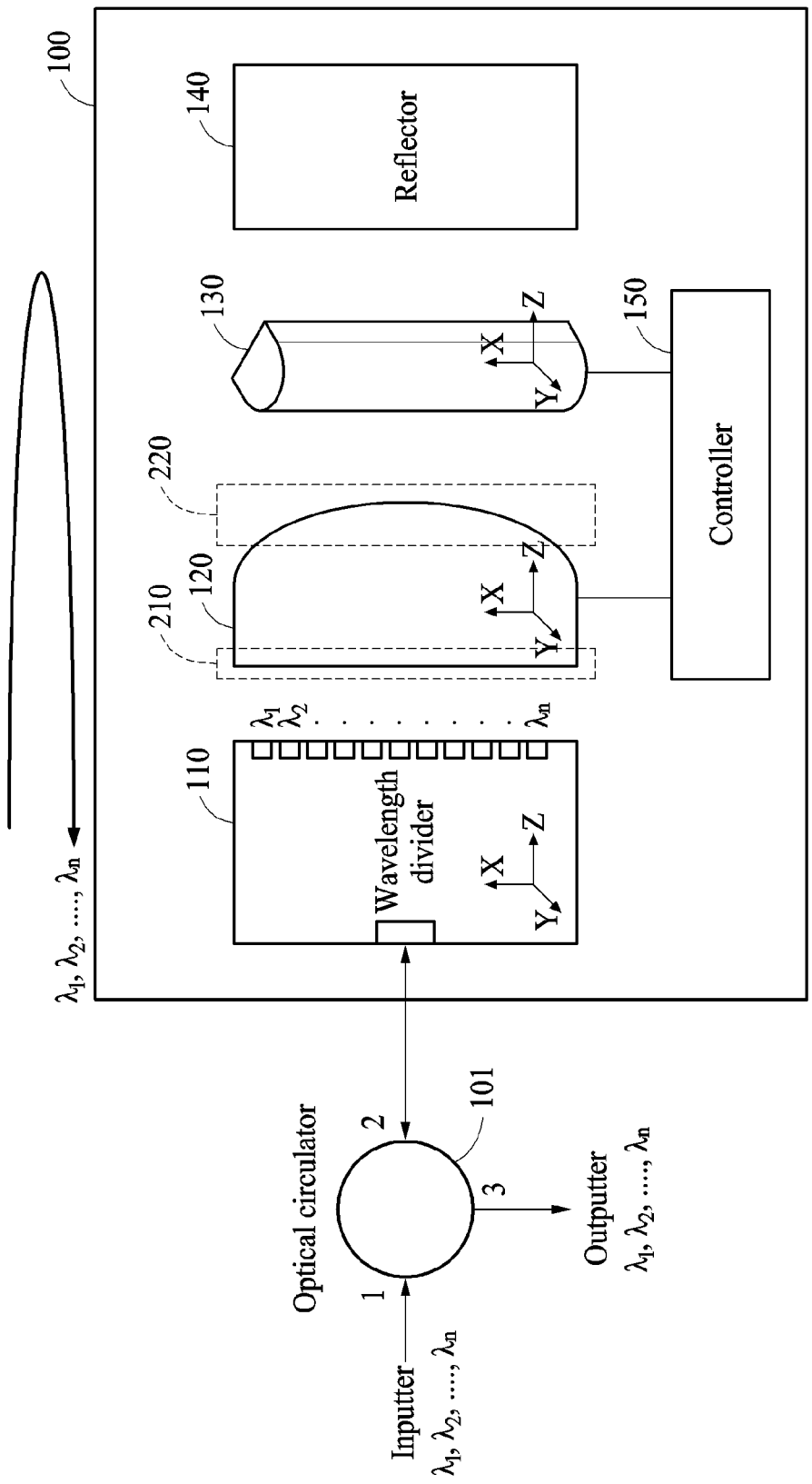
FIG. 2 is a diagram illustrating an example of a multi-wavelength transmission apparatus including a first cylindrical lens rotated according to an example embodiment.

FIG. 2 is a diagram illustrating an example of a multi-wavelength transmission apparatus including a first cylindrical lens rotated according to an example embodiment.

Referring to FIG. 2, the controller 150 may rotate the first cylindrical lens 120 by 90° in a Y-axial direction relative to a Z axis, or the first cylindrical lens 120 may rotate by 90° in the Y-axial direction relative to the Z axis to be disposed in the multi-wavelength transmission apparatus 100. Optical signals $\lambda_1, \lambda_2, \ldots, \lambda_n$ output from different positions of the wavelength divider 110 may be incident to the first cylindrical lens 120. In this example, in the optical signals incident to the first cylindrical lens 120, a beam travelling along an X axis may be collimated so as to be promoted as a parallel beam and a beam travelling along a Y axis may be diverged to be promoted in a Z direction.

In the optical signals output from the first cylindrical lens 120 to be incident to the second cylindrical lens 130, the beam travelling along the X axis may be maintained in the collimated state to be promoted as the parallel beam and the beam travelling along the Y axis may be collimated to be promoted as a parallel beam.

The optical signals output from the second cylindrical lens 130 may correspond to different positions for each wavelength. Also, in the optical signals, the beam travelling along the X axis and the beam travelling along the Y axis may be collimated to be incident to the reflector 140 as the parallel beams.

In the optical signals reflected from the reflector 140 to be incident to the second cylindrical lens 130, the beam travelling along the X axis may be maintained in the collimated state to be promoted as the parallel beam and the beam travelling along the Y axis may be focused to be promoted.

In the optical signals output from the second cylindrical lens 130 to be incident to the first cylindrical lens 120, the beam travelling along the X axis and the beam travelling along the Y axis may be focused to be promoted. For example, the optical signals incident to ports of the wavelength divider 110 may be input through focusing of the X axis and the Y axis.

Table 1 shows states of the optical signals output from the wavelength divider 110, the first cylindrical lens 120, the second cylindrical lens 130, and the reflector 140 of the multi-wavelength transmission apparatus 100 as below.

TABLE 1

| Optical signal path | Axis | Wavelength divider | Passing 1st cylindrical lens | Passing 2nd cylindrical lens | Reflector surface |
|---|---|---|---|---|---|
| Forward | X axis | Divergence | Collimation | Collimation (maintain) | Collimation (maintain) |
|  | Y axis | Divergence | Divergence | Collimation | Collimation (maintain) |
| Reverse | X axis | Focusing | Focusing | Collimation (maintain) | Collimation |
|  | Y axis | Focusing | Focusing | Focusing | Collimation |

Figure 3:
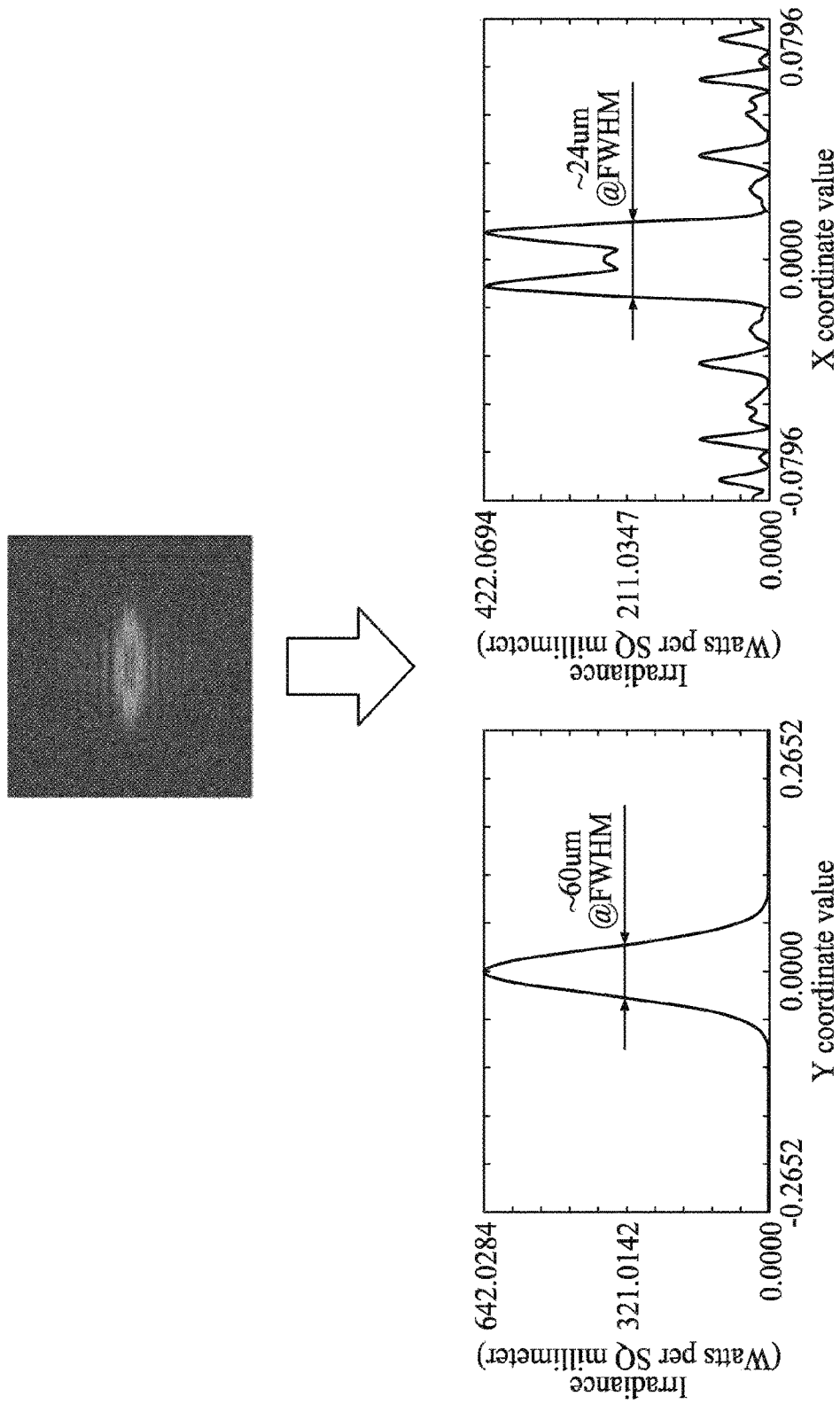
FIG. 3 is a diagram illustrating an example of a form of a beam reflected from a reflector of FIG. 2.

FIG. 3 is a diagram illustrating an example of a form of a beam reflected from a reflector of FIG. 2.

FIG. 3 illustrates a form of a beam of an optical signal having a single wavelength. In an example of FIG. 3, the optical signal may be input and reflected from the reflector 140 when a size of each port of an outputter of the wavelength divider 110 corresponds to 21 micrometers (μm) of an X axis and 6 μm of a Y axis and a gap between ports is 27.5 μm.

As illustrated in FIG. 3, the beam reflected from the reflector 140 may be 60 μm in an X-axial direction and 24 μm in a Y-axial direction. Thus, a Y-axial beam may be less than an X-axial beam. Also, the beam reflected from a surface of the reflector 140 may be greater than the size of each port of the outputter of the wavelength divider 110. Thus, the optical signal reflected from the reflector 140 may be focused to be incident to the port of the outputter of the wavelength divider 110.

Figure 4:
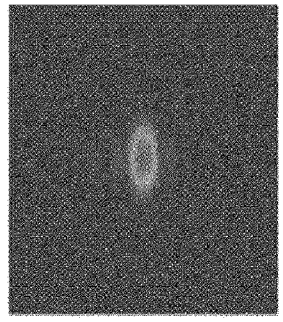
FIG. 4 is a diagram illustrating an example of a form of an incident beam that is reflected from the reflector of FIG. 2 to a wavelength divider.
Figure 4:
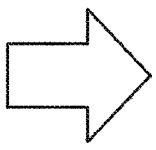
Figure 4:
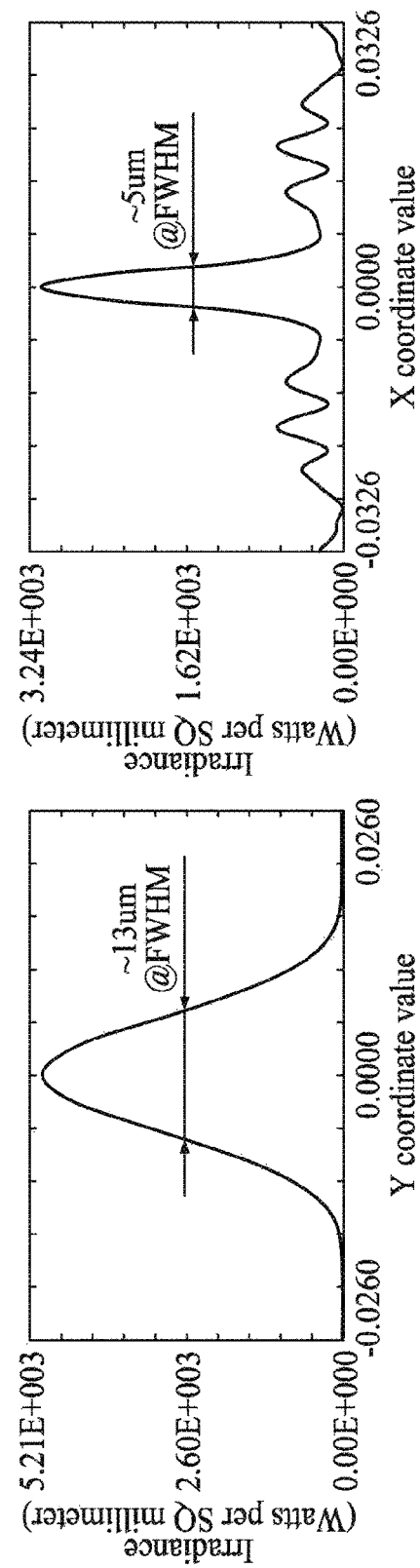

FIG. 4 is a diagram illustrating an example of a form of an incident beam that is reflected from the reflector of FIG. 2 to a wavelength divider.

FIG. 4 illustrates a form of a beam of an optical signal at a point in time at which the optical signal of FIG. 3 is incident to the wavelength divider 110 by passing through the second cylindrical lens 130 and the first cylindrical lens 120 after being reflected from the reflector 140.

In this example, as illustrated in FIG. 4, the form of the beam of the optical signal may be 13 μm in an X-axial direction and 5 μm in a Y-axial direction and thus, may be in a focused state in comparison to the beam of FIG. 3. As such, the beam of the optical signal at the point in time at which the optical signal is incident to the wavelength divider 110 may be less than a size of each port of the wavelength divider 110 and thus, may be readily incident to the port of the wavelength divider 110.

Figure 5:
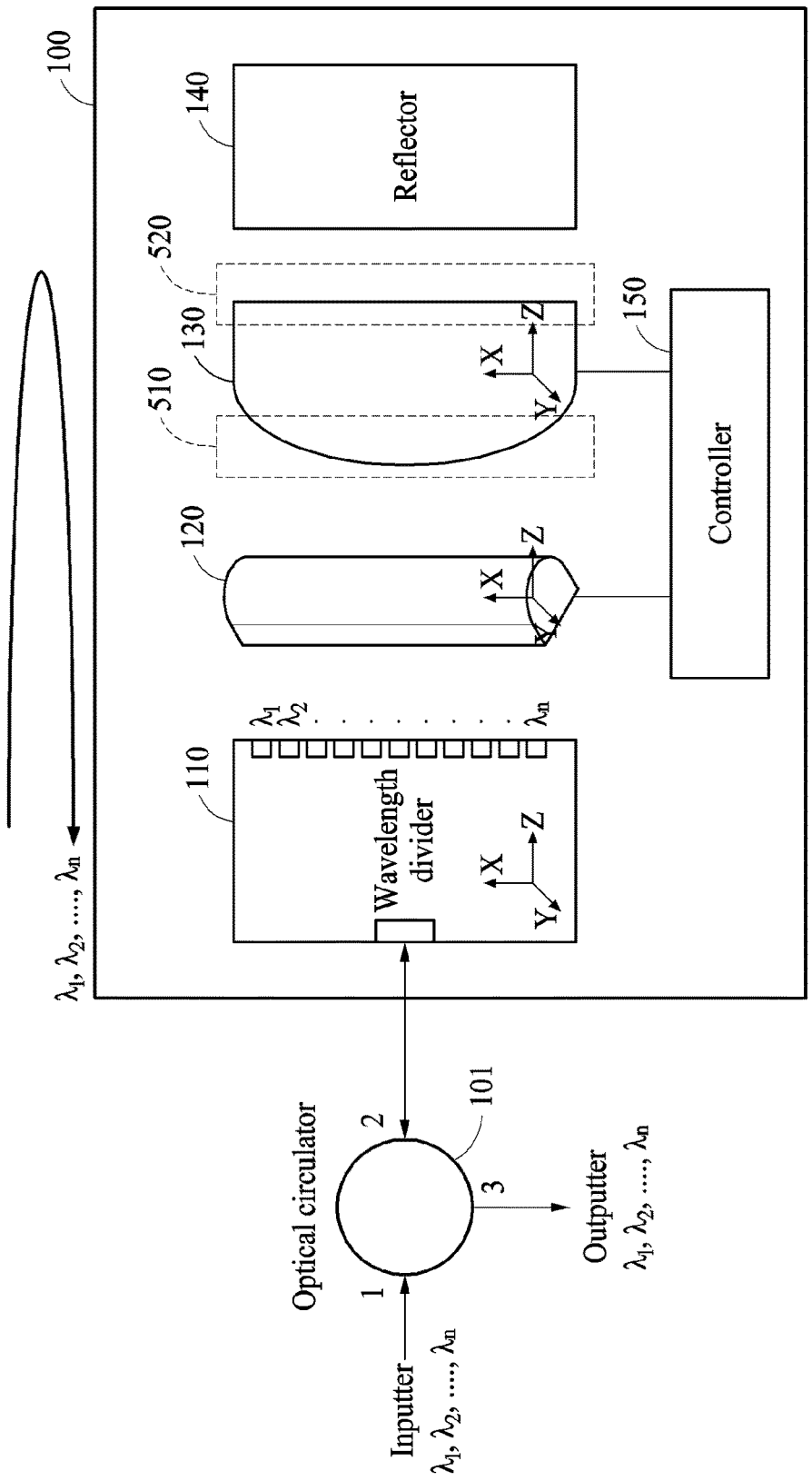
FIG. 5 is a diagram illustrating an example of a multi-wavelength transmission apparatus including a second cylindrical lens rotated according to an example embodiment.

FIG. 5 is a diagram illustrating an example of a multi-wavelength transmission apparatus including a second cylindrical lens rotated according to an example embodiment.

Referring to FIG. 5, the controller 150 may rotate the second cylindrical lens 130 by 90° in a Y-axial direction relative to a Z axis, or the second cylindrical lens 130 may rotate by 90° in the Y-axial direction relative to the Z axis to be disposed in the multi-wavelength transmission apparatus 100. Optical signals $\lambda_1, \lambda_2, \ldots, \lambda_n$ output from different positions of the wavelength divider 110 may be incident to the first cylindrical lens 120. In this example, in the optical signals incident to the first cylindrical lens 120, a beam travelling along an X axis may be diverged to be promoted in a Z direction and a beam travelling along a Y axis may be collimated so as to be promoted as a parallel beam.

In the optical signals output from the first cylindrical lens 120 to be incident to the second cylindrical lens 130, the beam travelling along the X axis may be collimated to be promoted as a parallel beam and the beam travelling along the Y axis may be maintained in a collimated state to be promoted as the parallel beam.

The optical signals output from the second cylindrical lens 130 may correspond to different positions for each wavelength. Also, in the optical signals, the beam travelling along the X axis and the beam travelling along the Y axis may be collimated to be incident to the reflector 140 as the parallel beams.

In the optical signals reflected from the reflector 140 to be incident to the second cylindrical lens 130, the beam travelling along the X axis may be focused to be promoted and the beam travelling along the Y axis may be maintained in the collimated state to be promoted as the parallel beam.

In the optical signals output from the second cylindrical lens 130 to be incident to the first cylindrical lens 120, the beam travelling along the X axis and the beam travelling along the Y axis may be focused to be promoted. For example, the optical signals incident to ports of the wavelength divider 110 may be input through focusing of the X axis and the Y axis.

Table 2 shows states of the optical signals output from the wavelength divider 110, the first cylindrical lens 120, the second cylindrical lens 130, and the reflector 140 of the multi-wavelength transmission apparatus 100 as below.

TABLE 2

| Optical signal path | Axis | Wavelength divider | Passing 1st cylindrical lens | Passing 2nd cylindrical lens | Reflector surface |
|---|---|---|---|---|---|
| Forward | X axis | Divergence | Divergence | Collimation | Collimation (maintain) |
|  | Y axis | Divergence | Collimation | Collimation (maintain) | Collimation (maintain) |
| Reverse | X axis | Focusing | Focusing | Focusing | Collimation |
|  | Y axis | Focusing | Focusing | Collimation (maintain) | Collimation |

Figure 6:
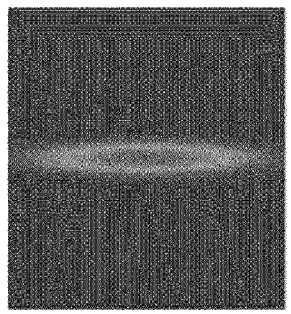
FIG. 6 is a diagram illustrating an example of a form of a beam reflected from a reflector of FIG. 5.
Figure 6:
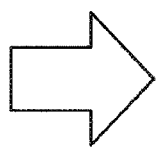
Figure 6:
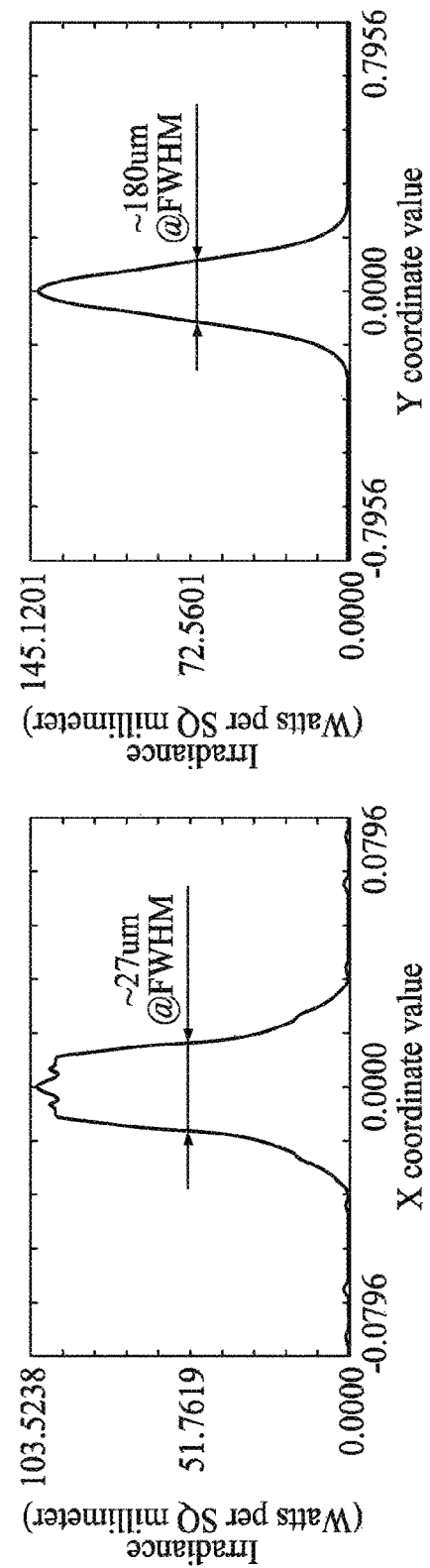

FIG. 6 is a diagram illustrating an example of a form of a beam reflected from a reflector of FIG. 5.

FIG. 6 illustrates a form of a beam of an optical signal having a single wavelength. In an example of FIG. 6, the optical signal may be input and reflected from the reflector 140 when a size of each port of an outputter of the wavelength divider 110 corresponds to 21 µm of an X axis and 6 µm of a Y axis and a gap between ports is 27.5 µm.

In this example, the beam reflected from the reflector 140 may be 27 µm in an X-axial direction and 180 µm in a Y-axial direction. Thus, an X-axial beam may be less than a Y-axial beam. Also, the beam reflected from a surface of the reflector 140 may be greater than the size of each port of the outputter of the wavelength divider 110. Thus, the optical signal reflected from the reflector 140 may be focused to be incident to the port of the outputter of the wavelength divider 110.

Figure 7:
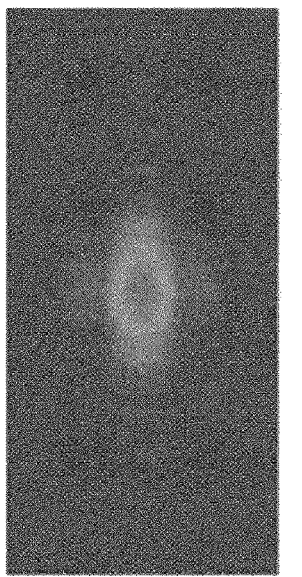
FIG. 7 is a diagram illustrating an example of a form of an incident beam that is reflected from the reflector of FIG. 5 to a wavelength divider.
Figure 7:
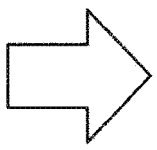
Figure 7:
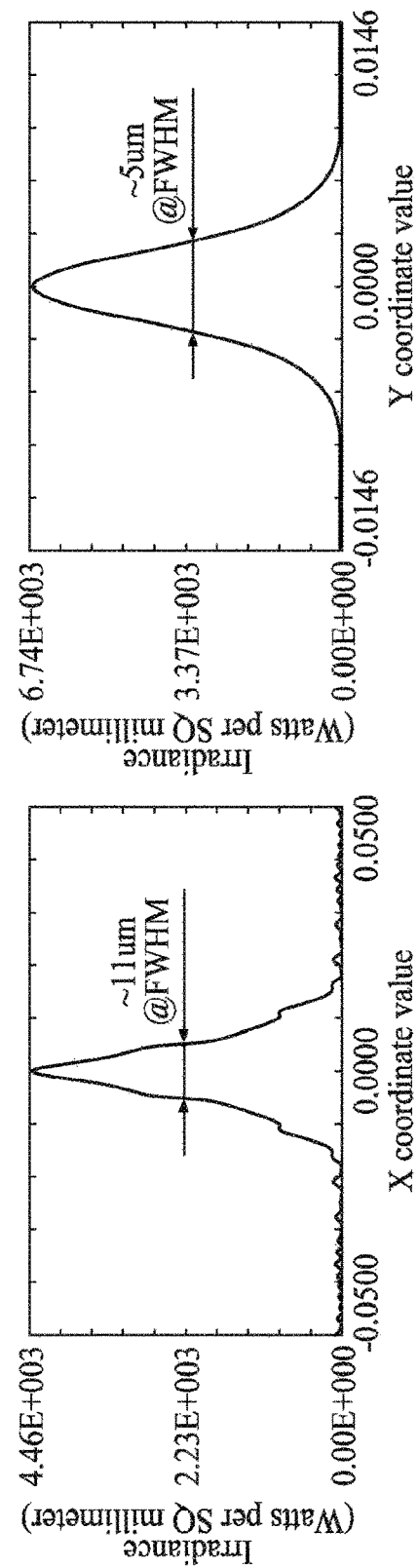

FIG. 7 is a diagram illustrating an example of a form of an incident beam that is reflected from the reflector of FIG. 5 to a wavelength divider.

FIG. 7 illustrates a form of a beam of an optical signal at a point in time at which the optical signal of FIG. 6 is incident to the wavelength divider 110 by passing through the second cylindrical lens 130 and the first cylindrical lens 120 after being reflected from the reflector 140.

In this example, the form of the beam of the optical signal may be 11 µm in an X-axial direction and 5 µm in a Y-axial direction and thus, may be in a focused state in comparison to the beam of FIG. 6. As such, the beam of the optical signal at the point in time at which the optical signal is incident to the wavelength divider 110 may be less than a size of each port of the wavelength divider 110 and thus, may be readily incident to the port of the wavelength divider 110.

Figure 8:
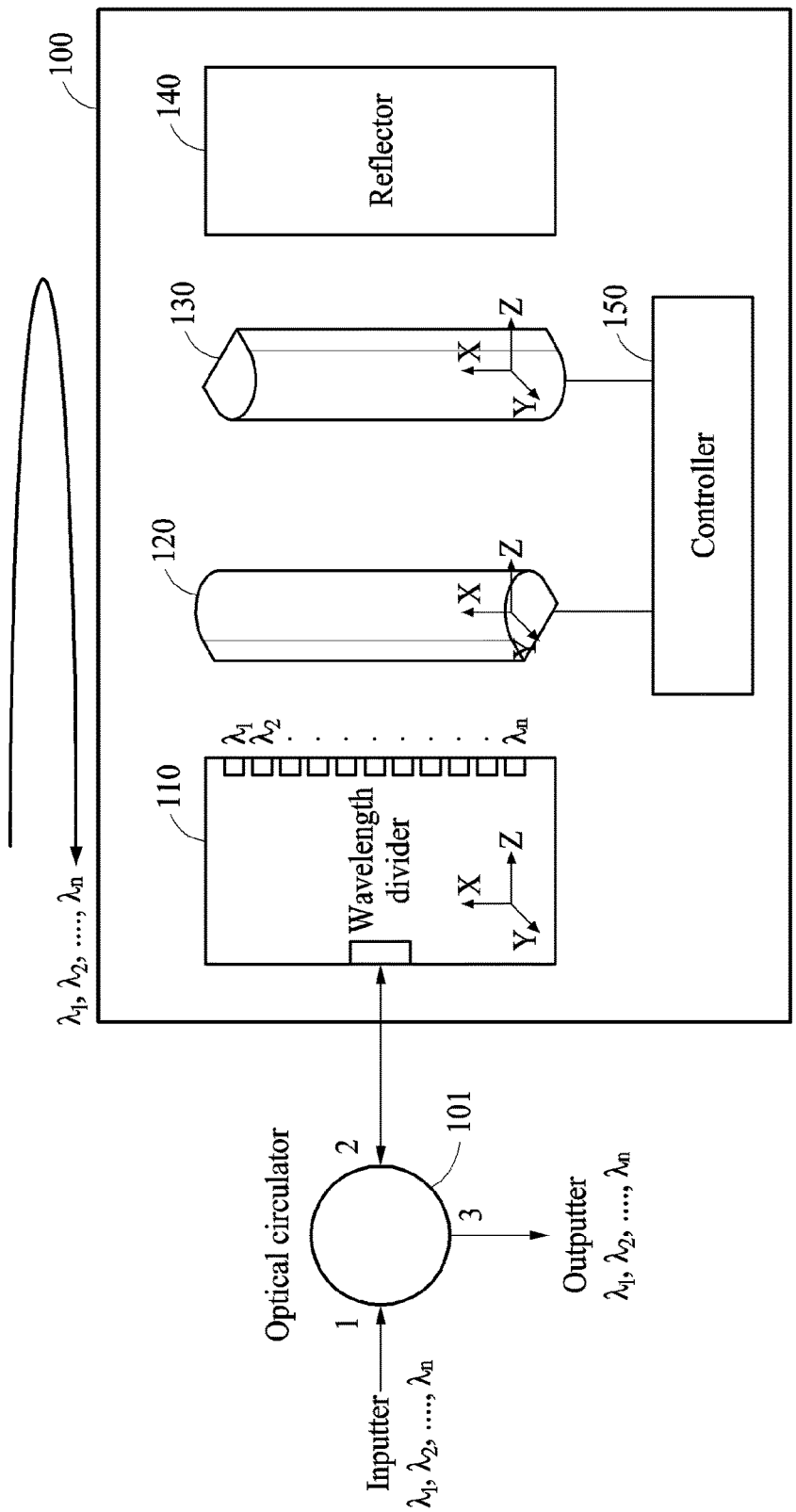
FIG. 8 is a diagram illustrating an example of a multi-wavelength transmission apparatus including a first cylindrical lens and a second cylindrical lens identically applied according to an example embodiment.

FIG. 8 is a diagram illustrating an example of a multi-wavelength transmission apparatus including a first cylindrical lens and a second cylindrical lens identically applied according to an example embodiment.

Referring to FIG. 8, the first cylindrical lens 120 and the second cylindrical lens 130 of the multi-wavelength transmission apparatus 100 may not be rotated about a Z axis. Optical signals $\lambda_1, \lambda_2, \ldots, \lambda_n$ output from different positions of the wavelength divider 110 may be incident to the first cylindrical lens 120. In this example, in the optical signals incident to the first cylindrical lens 120, a beam travelling along an X axis may be diverged to be promoted in a Z direction and a beam travelling along a Y axis may be collimated so as to be promoted as a parallel beam.

In the optical signals output from the first cylindrical lens 120 to be incident to the second cylindrical lens 130, the beam travelling along the X axis may be continually diverged to be promoted and the beam travelling along the Y axis may be focused to be promoted.

The optical signals output from the second cylindrical lens 130 may correspond to different positions for each wavelength. Also, in the optical signals, the beam travelling along the X axis may be diverged and the beam travelling along the Y axis may be focused so as to be incident to the reflector 140.

In the optical signals reflected from the reflector 140 to be incident to the second cylindrical lens 130, the beam travelling along the X axis may be diverged to be promoted and the beam travelling along the Y axis may be maintained in the collimated state to be promoted as the parallel beam.

In the optical signals output from the second cylindrical lens 130 to be incident to the first cylindrical lens 120, the beam travelling along the X axis may be diverged to be promoted and the beam travelling along the Y axis may be focused to be promoted. In this example, since an optical signal of which an X-axial beam is diverged and a Y-axial beam is focused is input to each port of the wavelength divider 110, a loss may occur due to the Divergence in the X axis.

Table 3 shows states of the optical signals output from the wavelength divider 110, the first cylindrical lens 120, the second cylindrical lens 130, and the reflector 140 of the multi-wavelength transmission apparatus 100 as below.

TABLE 3

| Optical signal path | Axis | Wavelength divider | Passing 1$^{st}$ cylindrical lens | Passing 2$^{nd}$ cylindrical lens | Reflector surface |
|---|---|---|---|---|---|
| Forward | X axis | Divergence | Divergence | Divergence | Divergence |
|  | Y axis | Divergence | Collimation | Focusing | Focusing |
| Reverse | X axis | Divergence | Divergence | Divergence | Divergence |
|  | Y axis | Focusing | Focusing | Collimation | Focusing |

Figure 9:
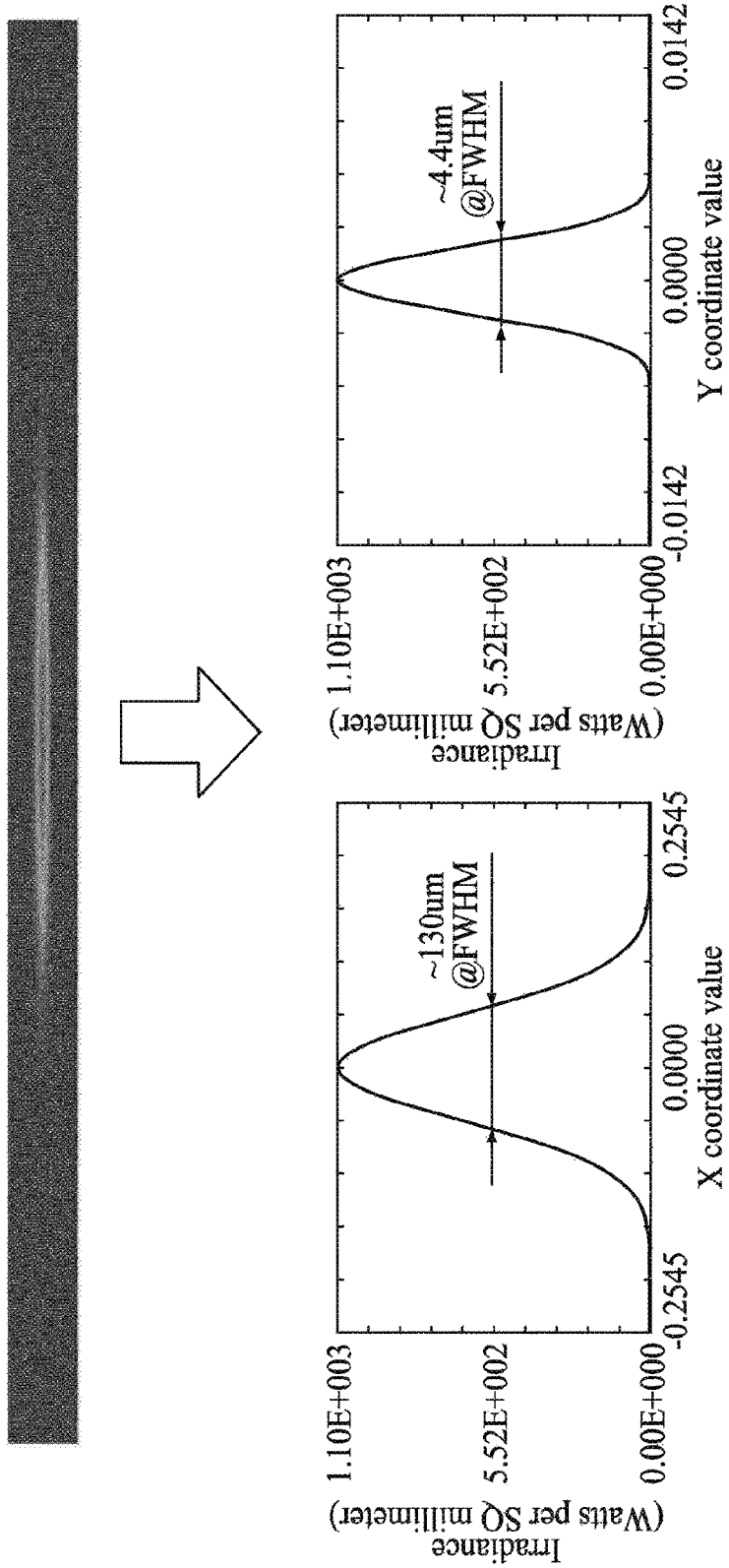
FIG. 9 is a diagram illustrating an example of a form of a beam reflected from a reflector of FIG. 8.

FIG. 9 is a diagram illustrating an example of a form of a beam reflected from a reflector of FIG. 8.

FIG. 9 illustrates a form of a beam of an optical signal having a single wavelength. In an example of FIG. 9, the optical signal may be input and reflected from the reflector 140 when a size of each port of an outputter of the wavelength divider 110 corresponds to 21 µm of an X axis and 6 µm of a Y axis and a gap between ports is 27.5 µm.

In this example, the beam reflected from the reflector 140 may be 130 µm in an X-axial direction and 4.4 µm in a Y-axial direction. Thus, a Y-axial beam may be less than an X-axial beam. Also, the beam reflected from a surface of the reflector 140 may be greater than the size of each port of the outputter of the wavelength divider 110. Thus, the optical signal reflected from the reflector 140 may be focused to be incident to the port of the outputter of the wavelength divider 110.

Figure 10:
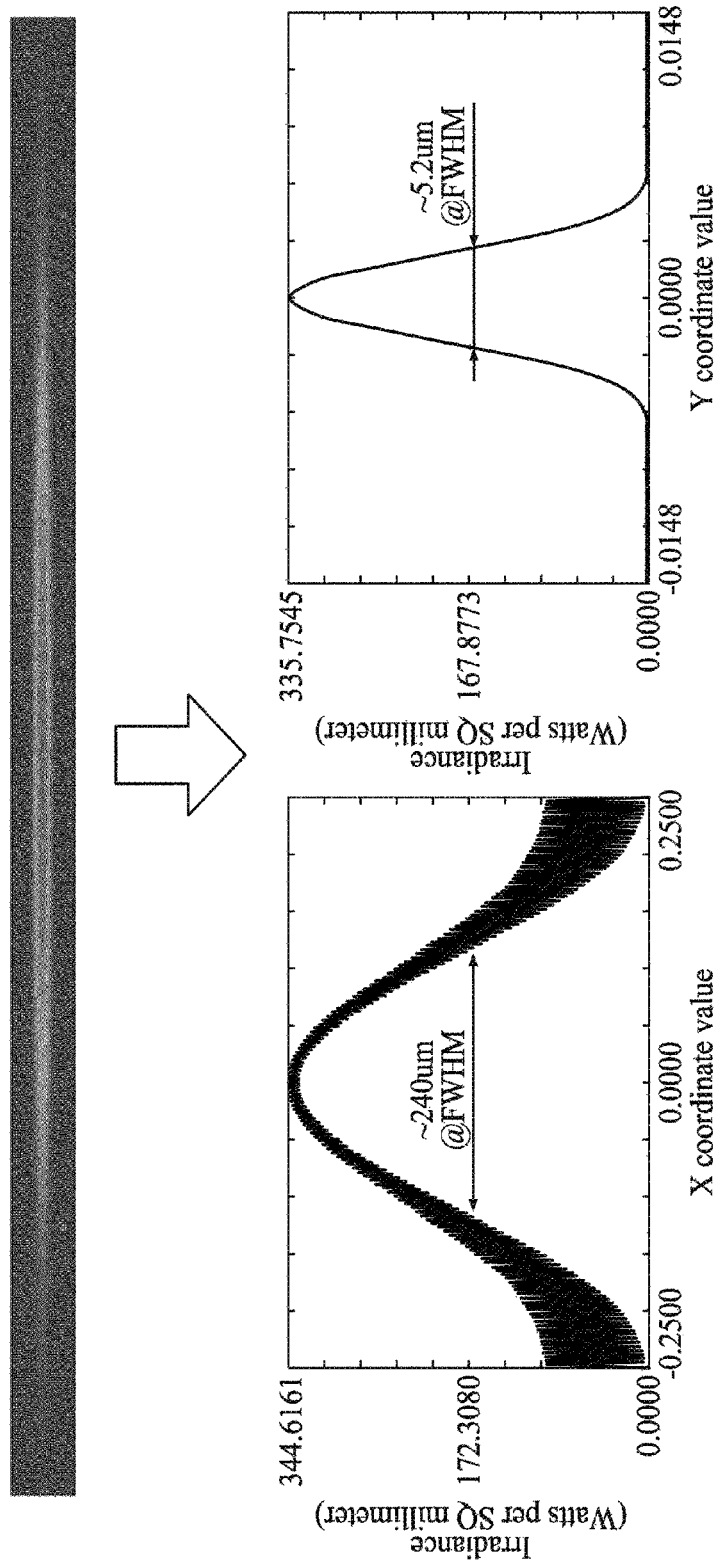
FIG. 10 is a diagram illustrating an example of a form of an incident beam that is reflected from the reflector of FIG. 8 to a wavelength divider.

FIG. 10 is a diagram illustrating an example of a form of an incident beam that is reflected from the reflector of FIG. 8 to a wavelength divider.

FIG. 10 illustrates a form of a beam of an optical signal at a point in time at which the optical signal of FIG. 9 is incident to the wavelength divider 110 by passing through the second cylindrical lens 130 and the first cylindrical lens 120 after being reflected from the reflector 140.

In this example, similarly to FIG. 4, the form of the beam of the optical signal may be 240 µm in an X-axial direction and 5.2 µm in a Y-axial direction and thus, may be input while a loss occurs due to an X-axial beam significantly greater than a Y-axial beam.

Figure 11:
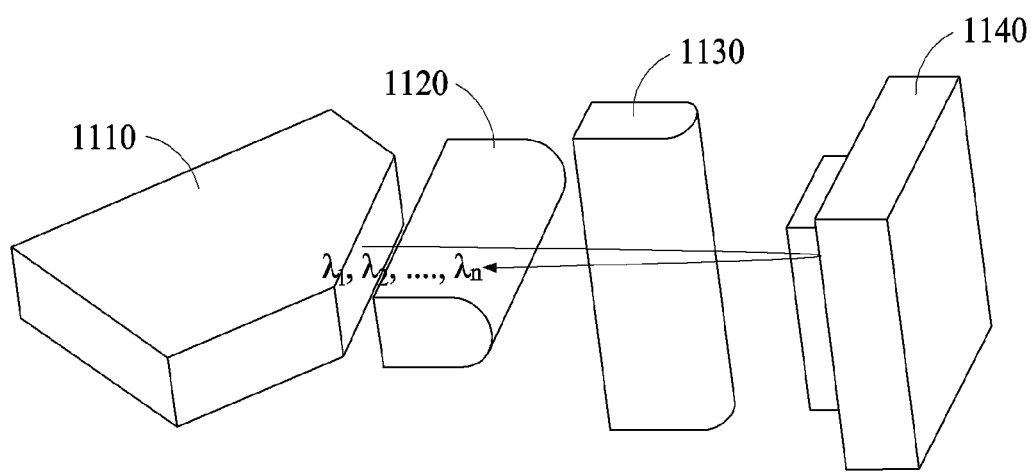
FIG. 11 is a diagram illustrating an example of a chromatic-dispersion control optical engine in which a multi-wavelength transmission apparatus is packaged according to an example embodiment.

FIG. 11 is a diagram illustrating an example of a chromatic-dispersion control optical engine in which a multi-wavelength transmission apparatus is packaged according to an example embodiment.

Referring to FIG. 11, in a chromatic-dispersion control optical engine, a first cylindrical lens 1120 may be disposed at an angle corresponding to a wavelength divider 1110 and a second cylindrical lens 1130 may be disposed at an angle perpendicular to the first cylindrical lens 1130. In this example, an optical signal output from the wavelength divider 1110 may be incident to a reflector 1140 by passing through the first cylindrical lens 1120 and the second cylindrical lens 1130. The optical signal incident to the reflector 1140 may be reflected from the reflector 1140 and pass through the second cylindrical lens 1130 and the first cylindrical lens 1120 so as to be incident to the wave divider 1110.

Figure 12:
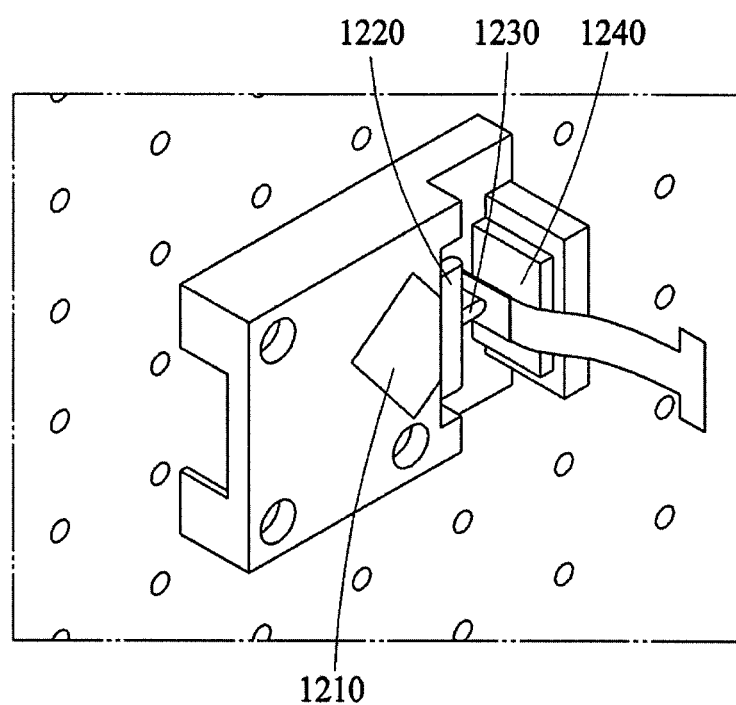
FIG. 12 is a diagram illustrating an example of a chromatic-dispersion control optical engine in which a multi-wavelength transmission apparatus is packaged according to an example embodiment.

FIG. 12 is a diagram illustrating an example of a chromatic-dispersion control optical engine in which a multi-wavelength transmission apparatus is packaged according to an example embodiment.

In an example of FIG. 12, a multi-wavelength transmission apparatus of the chromatic-dispersion control optical engine may use an arrayed waveguide grating (AWG) as a wavelength divider 1210. Also, the multi-wavelength transmission apparatus may perform packaging using a liquid crystal on silicon as a reflector 1240. A first cylindrical lens 1220 and a second cylindrical lens 1230 may be provided in the same form. Also, the second cylindrical lens 1230 may be aligned in a state in which the second cylindrical lens 1230 is rotated by 90° in a Y-axial direction.

Figure 13:
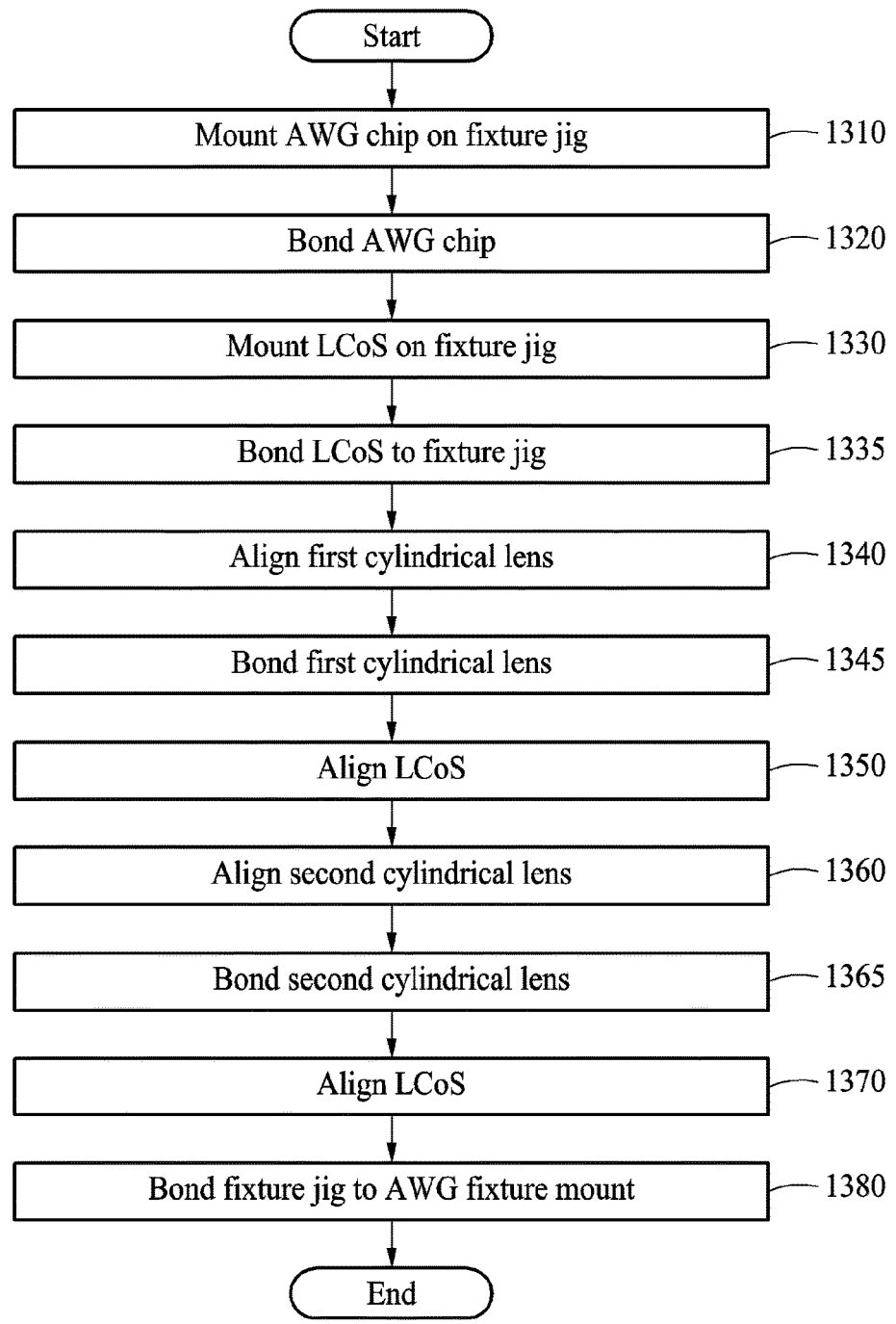
FIG. 13 is a flowchart illustrating a process of manufacturing a multi-wavelength transmission apparatus according to an example embodiment.

FIG. 13 is a flowchart illustrating a process of manufacturing a multi-wavelength transmission apparatus according to an example embodiment.

In operation 1310, a system for manufacturing a multi-wavelength transmission apparatus may mount an AWG on a fixture jig. In this example, the AWG may also be replaced with one of wavelength dividers other than the AWG.

Figure 14:
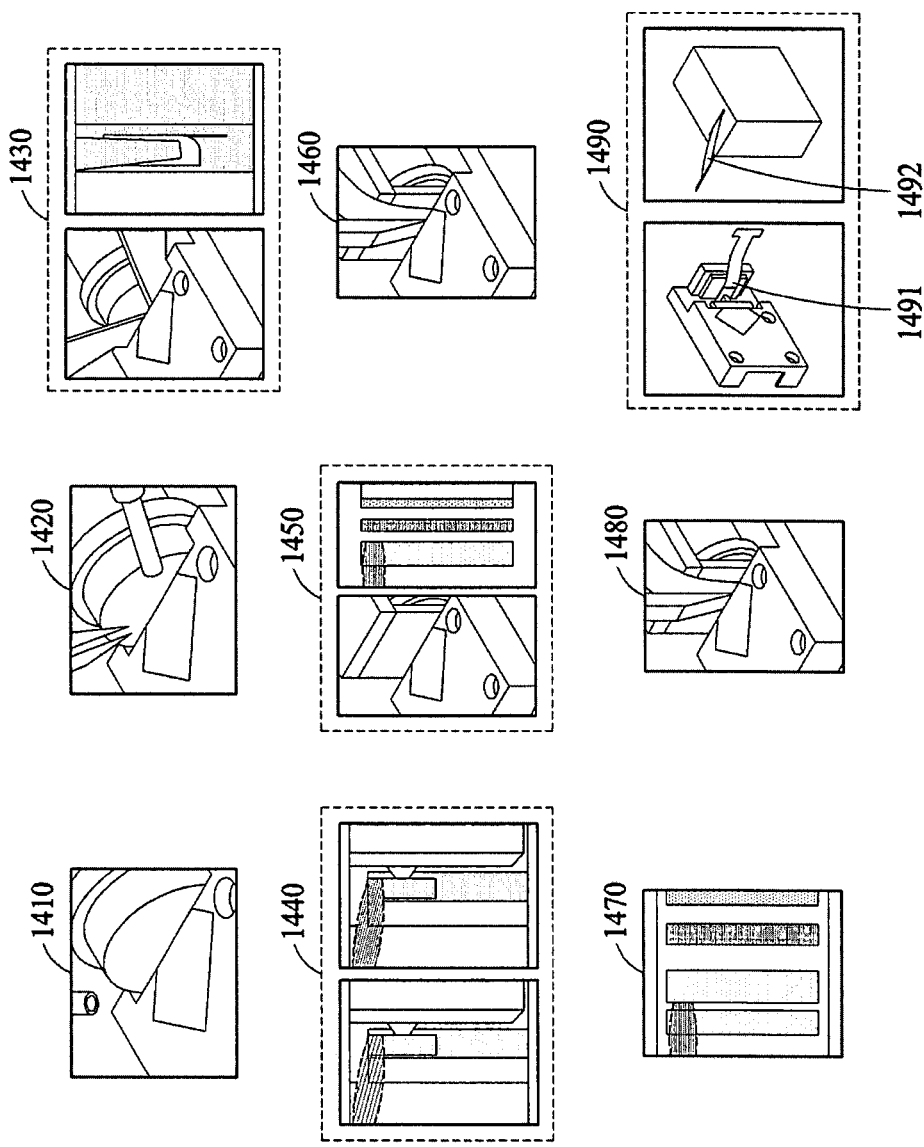
FIG. 14 is a diagram illustrating an example of a process of manufacturing the multi-wavelength transmission apparatus of FIG. 13.

In operation 1320, the system may bond the AWG mounted on the fixture jig in operation 1310. In a boding process, for example, an ultraviolet (UV) irradiation dose may be about 17000 milliwatts per square centimeter (mW/cm$^2$) and the system may perform operation 1320 for three minutes. Also, a multi-wavelength transmission apparatus on which operation 1320 is performed may be in a form as illustrated in an image 1410 of FIG. 14.

In operation 1330, the system may mount an LCoS on the fixture jig. In this example, the LCoS may be replaced with one of reflectors other than the LCoS.

In operation 1335, the system may bond the mounted LCoS to the fixture jig. In a boding process, for example, a UV irradiation dose may be about 17000 mW/cm$^2$ and the system may perform operation 1335 for five minutes. Also, a multi-wavelength transmission apparatus on which operation 1335 is performed may be in a form as illustrated in an image 1420 of FIG. 14.

In operation 1340, the system may align a first cylindrical lens. The system may rotate the first cylindrical lens by 90° in a Y-axial direction relative to a Z axis using a mirror and the LCos. The system may also not rotate the first cylindrical lens. For example, the first cylindrical lens aligned in operation 1340 may be in a form as illustrated in an image 1430 of FIG. 14.

In operation 1345, the system may bond the aligned first cylindrical lens to the fixture jig. In a boding process, for example, a UV irradiation dose may be about 17000 mW/cm$^2$ and the system may perform operation 1345 for five minutes. Also, a multi-wavelength transmission apparatus on which operation 1335 is performed may be in a form as illustrated in an image 1420 of FIG. 14.

In operation 1350, the system may align the LCoS bonded in operation 1335 based on the first cylindrical lens bonded in operation 1345. For example, the LCoS aligned in operation 1350 may be in a form as illustrated in an image 1450 of FIG. 14.

In operation 1360, the system may align a second cylindrical lens. The system may rotate the second cylindrical lens by 90° in the Y-axial direction relative to the Z axis using the mirror and the LCos.

For example, when the first cylindrical lens is rotated in operation 1340, the system may not rotate the second cylindrical lens. Also, when the first cylindrical lens is not rotated in operation 1340, the system may rotate the second cylindrical lens. The second cylindrical lens aligned in operation 1360 may be in a form as illustrated in an image 1460 of FIG. 14.

In operation 1365, the system may bond the aligned second cylindrical lens to the fixture jig. In a boding process, for example, a UV irradiation dose may be about 17000 mW/cm$^2$ and the system may perform operation 1365 for five minutes. Also, a multi-wavelength transmission apparatus on which operation 1365 is performed may be in a form as illustrated in an image 1470 of FIG. 14.

In operation 1370, the system may realign the LCoS aligned in operation 1350 based on the first cylindrical lens bonded in operation 1365. For example, the LCoS realigned in operation 1370 may be in a form as illustrated in an image 1480 of FIG. 14.

In operation 1380, the system may bond a fixture jig 1491 on which an LCoS mounted, to an AWG fixture mount 1492. In this example, the LCoS may be in a state in which the LCoS is aligned in operation 1370. In a boding process, for example, a UV irradiation dose may be about 17000 mW/cm$^2$ and the system may perform operation 1380 for fifteen minutes. Also, a multi-wavelength transmission apparatus on which operation 1380 is performed may be in a form as illustrated in an image 1490 of FIG. 14.

According to an aspect, it is possible to independently control phases of wavelength-divided optical signals for each wavelength by rotating at least one of a plurality of cylindrical lenses having the same characteristic.

According to another aspect, it is possible to independently control phases of wavelength-divided optical signals for each wavelength so as to be applicable as a dispersion compensation apparatus.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multi-wavelength transmission apparatus comprising:
   a wavelength divider configured to divide an optical signal by wavelength and output wavelength-divided optical signals to different positions, the optical signal being received from an optical circulator;
   a first cylindrical lens configured to diverge the wavelength-divided optical signals along an X axis and a Y axis and allow the wavelength-divided optical signals to be promoted in a Z-direction;
   a second cylindrical lens configured to diverge optical signals output from the first cylindrical lens along the X axis and the Y axis and allow the output optical signals to be promoted in the Z-direction;
   a reflector configured to reflect optical signals output from the second cylindrical lens toward the second cylindrical lens; and
   a controller configured to
      rotate any one or combination of the first cylindrical lens or the second cylindrical lens, and
      control an optical signal passing through the any one or combination of the first cylindrical lens or the second cylindrical lens to be maintained, diverged, collected, or any combination thereof.

2. The multi-wavelength transmission apparatus of claim 1, wherein the optical signals reflected by the reflector are incident to the wavelength divider by passing through the second cylindrical lens and the first cylindrical lens, collected in the wavelength divider, and incident to the optical circulator.

3. The multi-wavelength transmission apparatus of claim 1, wherein the first cylindrical lens includes any one or combination of a first face configured to maintain incident optical signals and output the maintained incident optical signals, a second face configured to diverge incident optical signals and output the diverged incident optical signals, or a third face configured to collect incident optical signals and output the collected optical signals, and
   the controller is configured to rotate the first cylindrical lens such that the wavelength-divided optical signals are output to one of the first face, the second face, and the third face.

4. The multi-wavelength transmission apparatus of claim 1, wherein the second cylindrical lens includes any one or combination of a first face configured to maintain incident optical signals and output the maintained incident optical signals, a second face configured to diverge incident optical signals and output the diverged incident optical signals, or a third face configured to collect incident optical signals and output the collected optical signals, and
   the controller is configured to rotate the second cylindrical lens such that the wavelength-divided optical signals are output to one of the first face, the second face, and the third face.

5. A multi-wavelength transmission apparatus comprising:
   a wavelength divider configured to divide an optical signal by wavelength and output wavelength-divided optical signals to different positions, the optical signal being received from an optical circulator;
   a first cylindrical lens configured to diverge the wavelength-divided optical signals travelling along an X axis and a Y axis and allow the wavelength-divided optical signals to be promoted in a Z-direction;
   a second cylindrical lens configured to diverge optical signals output from the first cylindrical lens travelling along the X axis and the Y axis and allow the output optical signals to be promoted in the Z-direction; and
   a reflector configured to reflect optical signals output from the second cylindrical lens toward the second cylindrical lens,
   wherein the first cylindrical lens is identical in shape to the second cylindrical lens and is rotated by 90 degrees in an Y-axial direction based on an X-axial direction of the second cylindrical lens.

6. The multi-wavelength transmission apparatus of claim 5, wherein the wavelength-divided optical signals are output from the wavelength divider such that an optical signal, among the optical signals, travelling along the X axis is collimated and an optical signal, among the optical signals, travelling along the Y axis is diverged, at the first cylindrical lens, and the optical signal travelling along the X axis and the optical signal travelling along the Y axis are collimated at the second cylindrical lens.

7. The multi-wavelength transmission apparatus of claim 5, wherein the optical signals are reflected from the reflector such that an optical signal, among the optical signals, travelling along the X axis is collimated and an optical signal, among the optical signals, travelling along the Y axis is focused, at the second cylindrical lens, and the optical signal travelling along the X axis and optical signal travelling along the Y axis are focused at the first cylindrical lens.

8. A multi-wavelength transmission apparatus comprising:
- a wavelength divider configured to divide an optical signal by wavelength and output wavelength-divided optical signals to different positions, the optical signal being received from an optical circulator;
- a first cylindrical lens configured to diverge the wavelength-divided optical signals travelling along an X axis and a Y axis and allow the wavelength-divided optical signals to be promoted in a Z-direction;
- a second cylindrical lens configured to diverge optical signals output from the first cylindrical lens travelling along the X axis and the Y axis and allow the output optical signals to be promoted in the Z-direction; and
- a reflector configured to reflect optical signals output from the second cylindrical lens toward the second cylindrical lens, wherein the second cylindrical lens is identical in shape to the first cylindrical lens and is rotated by 90 degrees in an Y-axial direction based on an X-axial direction of the first cylindrical lens.

9. The multi-wavelength transmission apparatus of claim 8, wherein the wavelength-divided optical signals are output from the wavelength divider such that an optical signal, among the optical signals, travelling along the X axis is diverged and an optical signal, among the optical signals, travelling along the Y axis is collimated, at the first cylindrical lens, and optical signal travelling along the X axis and optical signal travelling along the Y axis are collimated at the second cylindrical lens.

10. The multi-wavelength transmission apparatus of claim 8, wherein the optical signals are reflected from the reflector such that an optical signal, among the optical signals, travelling along the X axis is focused and an optical signal, among the optical signals, travelling along the Y axis is collimated, at the second cylindrical lens, and the optical signal travelling along the X axis and the optical signal travelling along the Y axis are focused at the first cylindrical lens.

* * * * *